United States Patent
Miksovsky et al.

(10) Patent No.: US 7,631,278 B2
(45) Date of Patent: Dec. 8, 2009

(54) SYSTEM AND METHOD FOR DIRECTIONAL FOCUS NAVIGATION

(75) Inventors: Jan T. Miksovsky, Seattle, WA (US); Atanas Georgiev Koralski, Redmond, WA (US); Henry David Hahn, Bellevue, WA (US); Sundaram Ramani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 10/993,535

(22) Filed: Nov. 19, 2004

(65) Prior Publication Data

US 2006/0112346 A1 May 25, 2006

(51) Int. Cl.
 *G06F 3/048* (2006.01)
(52) U.S. Cl. .................. 715/857; 715/856; 715/858; 715/859; 715/860; 715/861; 715/862
(58) Field of Classification Search .......... 715/856–862
 See application file for complete search history.

(56) References Cited

U.S. PATENT DOCUMENTS

| | | | | |
|---|---|---|---|---|
| 4,745,405 | A * | 5/1988 | Himelstein et al. .......... | 715/856 |
| 5,164,713 | A * | 11/1992 | Bain .......................... | 715/862 |
| 5,544,299 | A | 8/1996 | Wenstrand | |
| 5,565,887 | A * | 10/1996 | McCambridge et al. ..... | 715/856 |
| 5,613,120 | A | 3/1997 | Palay | |
| 5,625,763 | A | 4/1997 | Cirne | |
| 5,673,401 | A | 9/1997 | Volk | |
| 5,701,139 | A * | 12/1997 | Weinbaum et al. .......... | 715/858 |
| 5,774,111 | A * | 6/1998 | Lecland et al. .............. | 715/856 |
| 5,798,752 | A * | 8/1998 | Buxton et al. ............... | 715/863 |
| 5,808,604 | A * | 9/1998 | Robin ......................... | 715/862 |
| 5,915,253 | A | 6/1999 | Christiansen | |
| 5,973,689 | A * | 10/1999 | Gallery ....................... | 715/859 |
| 6,034,689 | A | 3/2000 | White | |
| 6,072,485 | A | 6/2000 | Barnes | |
| 6,215,490 | B1 | 4/2001 | Kaply | |
| 6,249,284 | B1 | 6/2001 | Bogdan | |
| 6,252,592 | B1 | 6/2001 | King | |
| 6,266,043 | B1 * | 7/2001 | Robin ......................... | 715/858 |
| 6,538,670 | B1 * | 3/2003 | Kido ........................... | 715/767 |
| 6,606,106 | B1 | 8/2003 | Mendenhall | |
| 6,654,038 | B1 | 11/2003 | Gajewska | |

(Continued)

OTHER PUBLICATIONS

Office Action dated Dec. 23, 2008 cited in U.S. Appl. No. 10/993,672.

(Continued)

*Primary Examiner*—Ting Lee
*Assistant Examiner*—Ashraf Zahr
(74) *Attorney, Agent, or Firm*—Workman Nydegger

(57) ABSTRACT

A system and method for improved directional focus navigation in a user interface is provided. The directional focus navigation engine may receive directional input for changing the input focus of a user interface object in the user interface. A target candidate selector may select target candidates in a direction of travel among one or more user interface objects for receiving the input focus. A target candidate scorer may score the target candidates selected and the directional focus navigation engine may change the input focus to user interface object based upon the scoring. Scoring the target candidates may be biased when navigation continues in the same traversal direction for changing input focus.

36 Claims, 11 Drawing Sheets

U.S. PATENT DOCUMENTS

| | | | |
|---|---|---|---|
| 6,717,600 B2 * | 4/2004 | Dutta et al. | 715/862 |
| 6,907,580 B2 | 6/2005 | Michelman | |
| 6,918,090 B2 | 7/2005 | Hesmer | |
| 7,062,717 B2 | 6/2006 | Scott | |
| 7,098,933 B1 * | 8/2006 | Thoemmes et al. | 345/677 |
| 7,134,089 B2 | 11/2006 | Celik | |
| 7,194,702 B1 * | 3/2007 | Peasley | 715/856 |
| 7,197,717 B2 | 3/2007 | Anderson | |
| 7,240,299 B2 * | 7/2007 | Abrams | 715/857 |
| 7,246,306 B2 | 7/2007 | Chen | |
| 7,346,855 B2 | 3/2008 | Hellyar | |
| 2002/0075333 A1 * | 6/2002 | Dutta et al. | 345/862 |
| 2002/0158920 A1 * | 10/2002 | Abrams | 345/856 |
| 2002/0163542 A1 | 11/2002 | Costea | |
| 2003/0174170 A1 | 9/2003 | Jung | |
| 2004/0075699 A1 * | 4/2004 | Franchi et al. | 345/860 |
| 2004/0100500 A1 | 5/2004 | Chung | |
| 2005/0071785 A1 | 3/2005 | Chadzelek | |
| 2005/0086610 A1 * | 4/2005 | Mackinlay et al. | 715/817 |
| 2006/0010402 A1 * | 1/2006 | Undasan | 715/861 |
| 2007/0113205 A1 | 5/2007 | Bogdan | |
| 2007/0124686 A1 | 5/2007 | Ramani | |

OTHER PUBLICATIONS

Office Action dated Aug. 23, 2007 cited in related U.S. Appl. No. 10/993,672.

Office Action dated Apr. 18, 2008 cited in related U.S. Appl. No. 10/993,672.

* cited by examiner

SYSTEM AND METHOD FOR DIRECTIONAL FOCUS NAVIGATION

CROSS-REFERENCE TO RELATED APPLICATIONS

The present invention is related to the following copending United States Patent Application filed concurrently herewith, assigned to the assignee of the present invention, and hereby incorporated by reference in its entirety, "System and Method for Property-Based Focus Navigation in a User Interface," Ser. No. 10/993,672.

FIELD OF THE INVENTION

The invention relates generally to computer systems, and more particularly to an improved system and method for directional focus navigation.

BACKGROUND OF THE INVENTION

In order to change input focus to a user interface object in a user interface for receiving input from an input device, a user may choose to navigate across several user interface objects in the user interface using a directional input device, such as arrow keys on a keyboard, until successfully arriving upon the user interface object desired to have input focus. Such a process for traversing user interface objects using a directional input device to change input focus of a user interface object in a user interface may be known as directional focus navigation. Although performing directional focus navigation across a few user interface objects in a user interface to change input focus to a particular user interface object may be a relatively simple task for a user, navigating across a large set of user interface objects using directional input focus may be a frustrating user experience.

For example, directional focus navigation may produce unexpected results for users when navigating a large set of user interface objects for changing input focus. Typical directional focus navigation software may choose successive user interface objects during navigation based upon immediate proximity to the previous user interface object that had input focus when navigating among user interface objects in a given direction. Unfortunately, each successive traversal may progressively lead away from the general direction of the path desired by the user. As a result, the user may need to perform course corrections during directional focus navigation until successfully arriving at the user interface object desired to have input focus.

What is needed is a way for users to navigate more predictably and reliably across user interface objects for changing input focus using a directional input device. Moreover, such a system and method should allow a user to navigate across a large set of user interface elements that may receive input focus.

SUMMARY OF THE INVENTION

Briefly, the present invention provides an improved system and method for directional focus navigation in a user interface. To this end, the present invention may provide a directional focus navigation engine that may receive directional input for changing the input focus of a user interface object in the user interface. The directional focus navigation engine may include a target candidate selector for selecting target candidates in a direction of travel among one or more user interface objects for receiving the input focus. The directional focus navigation engine may also include a target candidate scorer for scoring the target candidates selected for receiving the input focus. Advantageously, the directional focus navigation may generally operate on any computing device that may receive any discrete direction indication for changing the input focus of a user interface.

The present invention may also provide methods for directional focus navigation in a user interface. When directional input for changing input focus of a user interface object is received, target candidates may be selected in a direction of travel among one or more user interface objects for receiving the input focus. Target candidates selected may then be scored for receiving input focus and the input focus may be changed to user interface object based upon the scoring. Significantly, scoring the target candidates may be biased when navigation continues in the same traversal direction for changing input focus. In one embodiment, the present invention may bias scoring of target candidates that overlap a baseline region emanating from the first user interface initially given input focus in the direction of navigation in favor of those that are outside of the baseline region. To do so, a calculation point may be used in scoring may be selected as near as possible to the baseline of the first user interface object given input focus in that traversal direction.

In general, the system and method may offer more predictable directional focus navigation for changing input focus of user interface objects when navigation continues in the same traversal direction. Other advantages will become apparent from the following detailed description when taken in conjunction with the drawings, in which:

DETAILED DESCRIPTION

Exemplary Operating Environment

Figure 1:
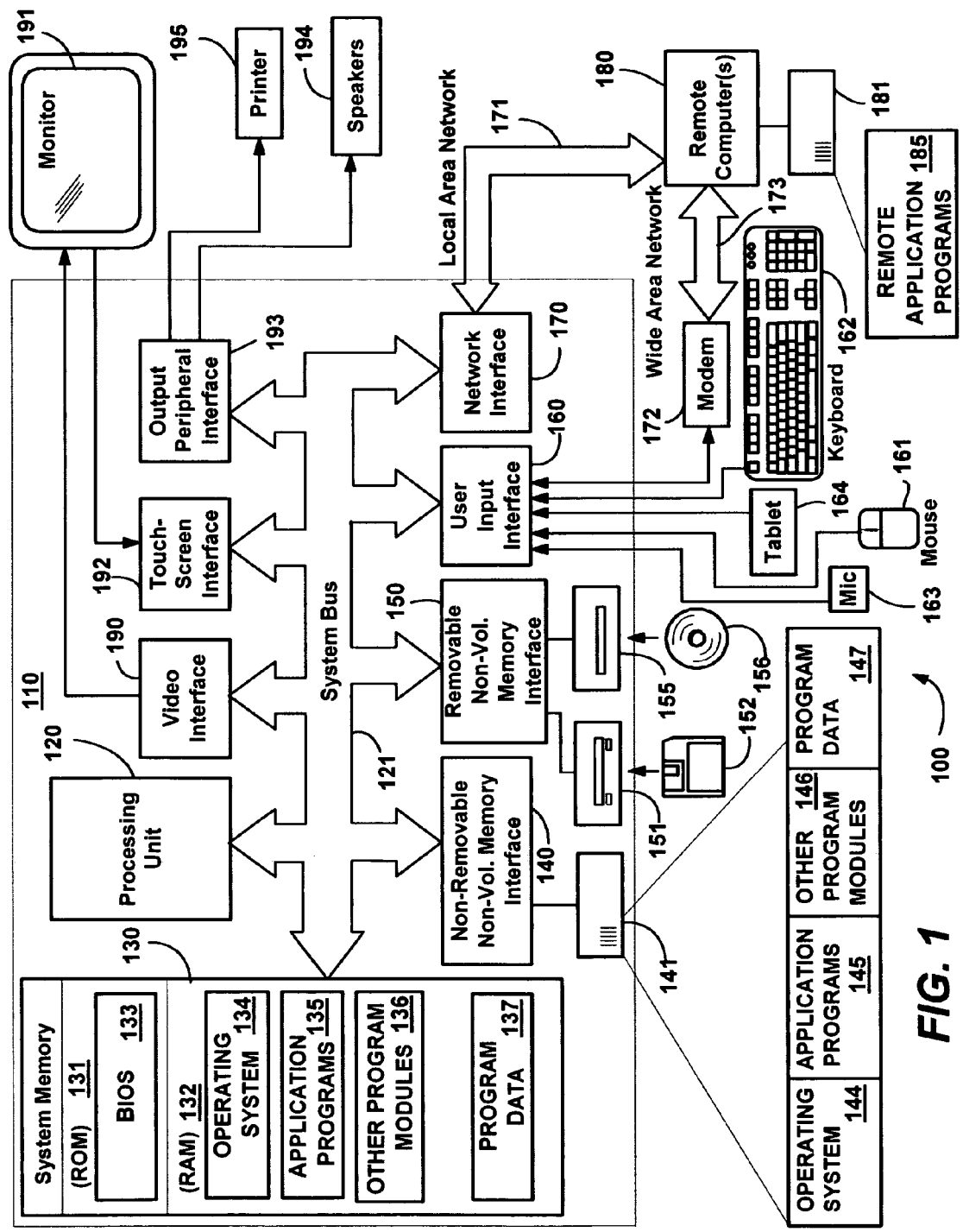
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 192 or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Directional Focus Navigation

The present invention is generally directed towards an improved system and method for directional focus navigation. As used herein, directional focus navigation may mean directionally traversing user interface objects of a user interface for changing input focus. A direction of travel, also referred to herein as a traversal direction, may mean the direction in which user interface objects of a user interface may be traversed. Advantageously, the system and method offer predictable directional focus navigation by biasing scoring of target candidates for receiving input focus when navigation continues in the same traversal direction. For example, the present invention may bias scoring of target candidates that overlap a baseline region emanating from the first user interface initially given input focus in the direction of navigation in favor of those that are outside of the baseline region.

Importantly, the present invention may be used for directional focus navigation by any computing device that may receive any discrete direction indication for changing the input focus of a user interface. As will be understood, the various block diagrams, flowcharts, illustrations and scenarios described herein are only examples, and there are many other scenarios to which the present invention will apply.

Figure 2:
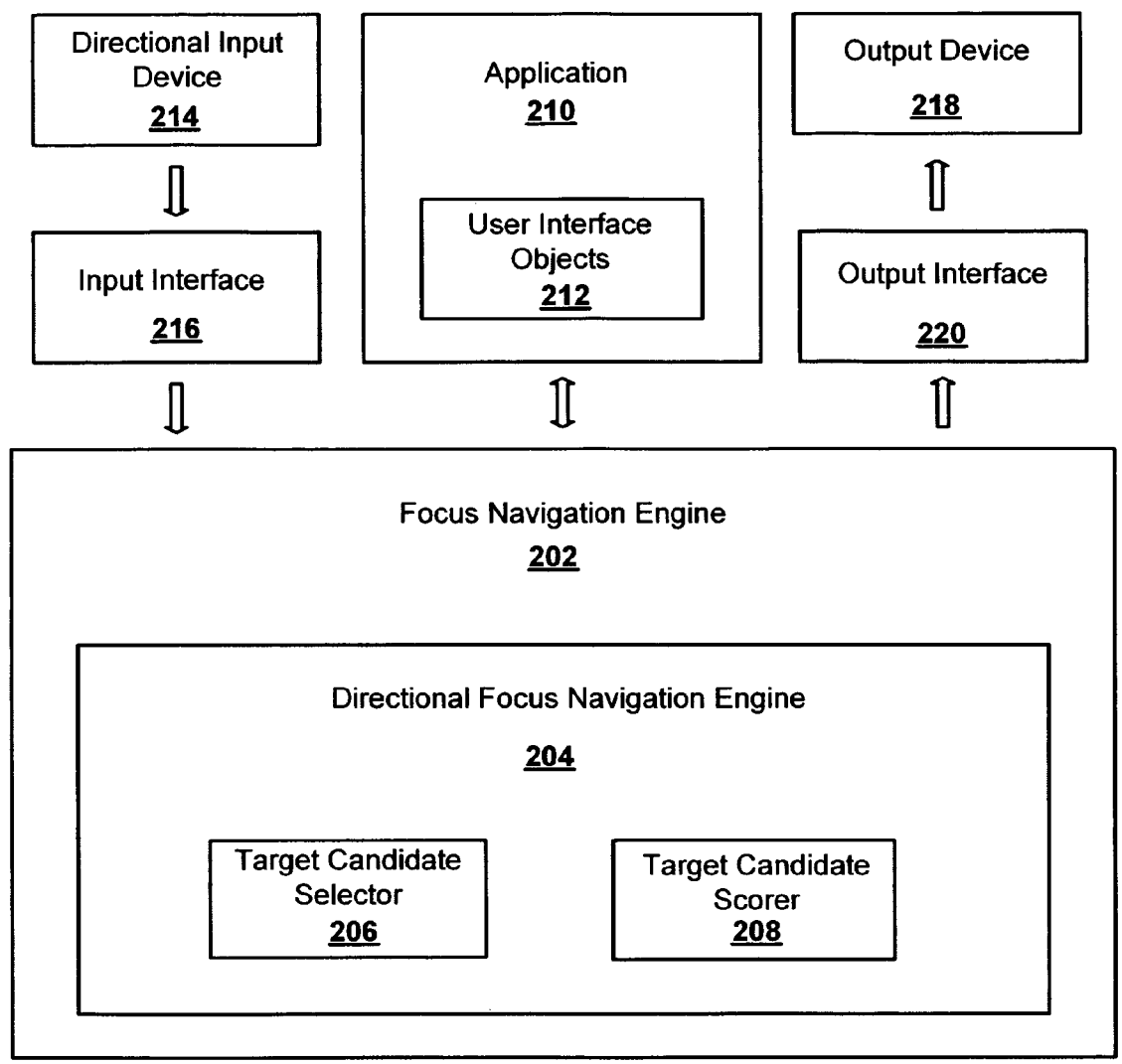
FIG. 2 is a block diagram generally representing an exemplary architecture of system components for directional focus navigation, in accordance with an aspect of the present invention.

Turning to FIG. 2 of the drawings, there is shown a block diagram generally representing an exemplary architecture of system components for directional focus navigation. Those skilled in the art will appreciate that the functionality implemented within the blocks illustrated in the diagram may be implemented as separate components or the functionality of several or all of the blocks may be implemented within a single component. For example, the functionality for the target candidate scorer 208 may be included in the target candidate selector 206, or the functionality of the directional focus navigation engine 204 may be implemented as a separate component from the focus navigation engine 202.

The focus navigation engine 202 may accept user input for changing the input focus of the user interface, including any discrete direction indication for directional focus navigation. The focus navigation engine 202 may include an operably coupled directional focus navigation engine 204 for directionally traversing user interface objects of a user interface for changing input focus. The directional focus navigation engine 204 may include an operably coupled target candidate selector 206 for selecting target candidates in a traversal direction among one or more user interface objects for receiving the input focus. The direction navigation engine 204 may also include an operably coupled target candidate scorer for scoring the target candidates selected for receiving the input focus. In general, the focus navigation engine 202, the directional focus navigation engine 204, the target candidate selector 206 and the target candidate scorer 208 may be any type of executable software code such as a kernel component, an application program, a linked library, an object, and so forth.

An application 210 having one or more user interface objects 212 may be operably coupled to the focus navigation engine 202. The application 210 may also be any type of executable software code such as a kernel component, an application program, a linked library, an object, and so forth. The application 210 may execute on a computer system such as computer system 110 to display elements of a user interface, including a user interface object with input focus, among other things. A user interface object of the application may also be referred to as a user interface element and means herein any visual primitive used to build a graphical user interface screen including without limitation a ListBox, ComboBox, Menu, dialog box, a control, ToolBar, a Frame, a Window, and so forth. For instance, a user interface object may include other user interface objects.

A directional input device 214 may be operably coupled to the input interface 216 for sending directional input from a user to a input interface 216. The directional input device 214 may be any device capable of providing a discrete direction indication for directional focus navigation, including arrow keys of a keyboard, a directional key of a phone, a directional pad such as forward or backward of a remote control, and so forth. An input interface 216 may be operably coupled to the focus navigation engine 204 for communicating input from a directional input device 214 to the focus navigation engine 202. An output interface 220 may also be operably coupled to the focus navigation engine 204 for outputting an indication of the user interface object with the input focus to an output device 218. An output device 218 may be operably coupled to the output interface for receiving an indication of the user interface object with the input focus. For instance, the output device in one embodiment may be a user interface display that may receive a display representation of the user interface object with input focus for displaying on the user interface display. The input interface 216 and the output interface 220 may also be any type of executable software code such as a kernel component, an application program, a linked library, an object, and so forth.

Figure 3:
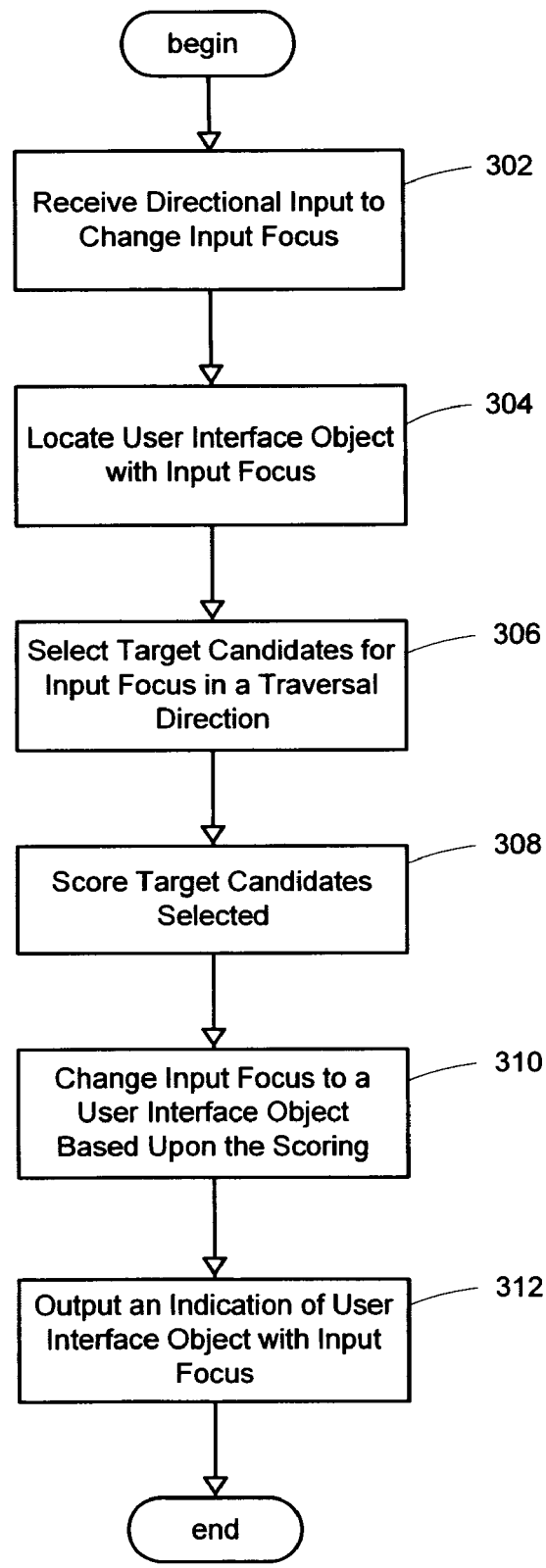
FIG. 3 is a flowchart generally representing the steps undertaken in one embodiment for directional focus navigation, in accordance with an aspect of the present invention.

FIG. 3 presents a flowchart generally representing the steps undertaken in one embodiment for directional focus navigation. At step 302, directional input for changing the input focus of a user interface may be received. For instance, directional input may be received in one embodiment from depressing an arrow key pointing rightward. In another embodiment, directional input may be received from depressing a backward key of a phone pad. After directional input may be received, the user interface object that has the input focus may be located at step 304. A user interface object that has input focus may be distinguished from other user interface objects in a user interface display by some form of visualization, such as highlighting, to provide an indication to a user interacting with the application which user interface object has input focus.

Once the user interface object that has the input focus may be located, target candidates in a traversal direction may be selected among one or more user interface objects for receiving the input focus at step 306. In one embodiment, target candidates may be selected that overlap a region of a user interface display in the direction of travel. In another embodiment, target candidates may be selected that overlap either the user interface object with input focus or a region of a user interface display in the direction of travel. Upon selecting target candidates in the direction of travel for receiving the input focus, the target candidates selected may be scored at step 308. In one embodiment, target candidates may be scored by determining a perpendicular distance from the user interface object with input focus. In another embodiment, target candidates may be scored by determining a radial distance from the user interface object with input focus.

After scoring target candidates, the input focus may be changed to a user interface object based upon the scoring at step 310. In one embodiment, the input focus may be changed to the user interface object with the lowest score. Finally, an indication of the user interface object with the input focus may be output at step 312. The indication output in one embodiment may be a display representation of the user interface object with input focus for displaying on a user interface display. After outputting the indication of the user interface object with the input focus, processing may be finished.

Figure 4:
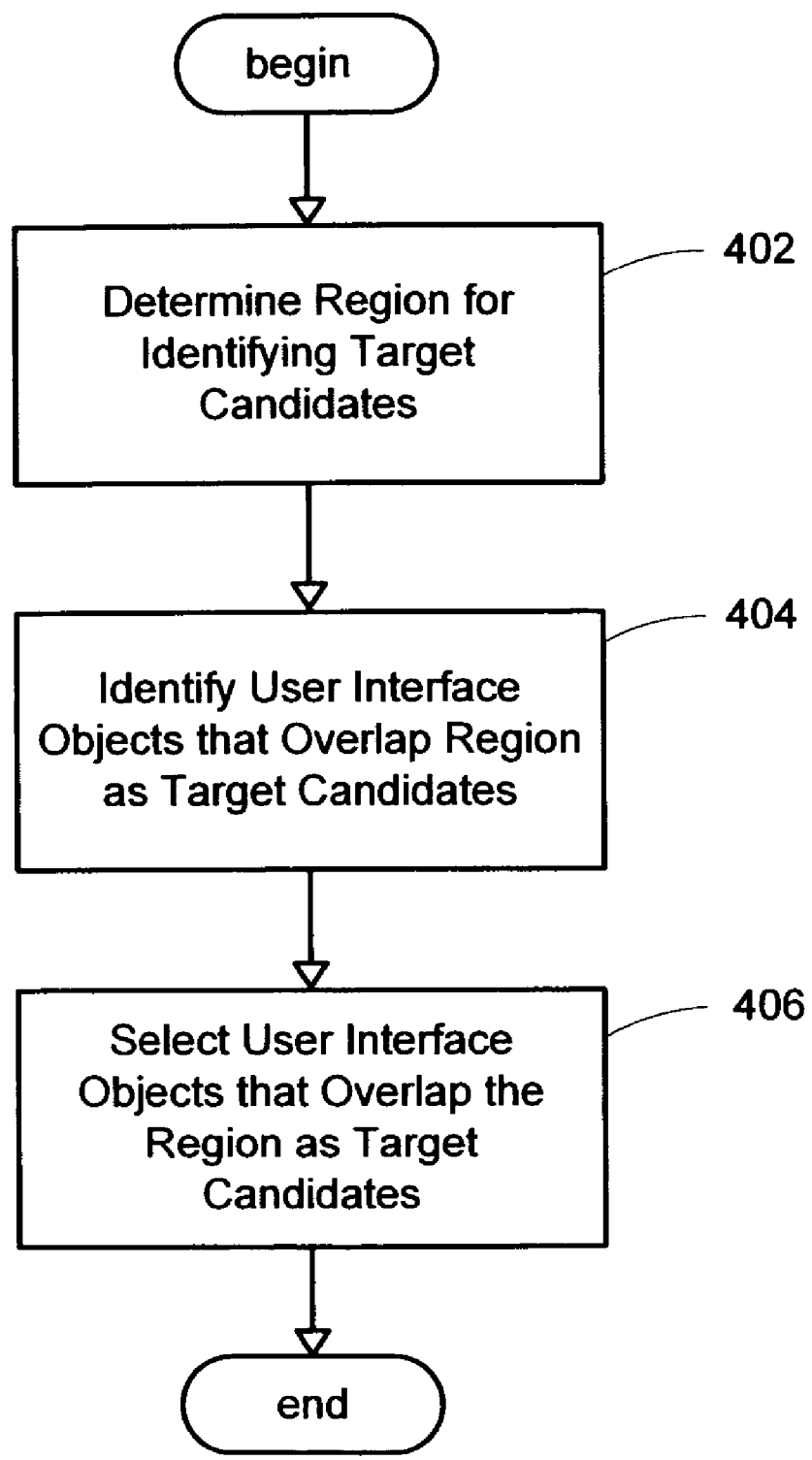
FIG. 4 is a flowchart generally representing one embodiment of the steps undertaken for selecting target candidates for input focus in a traversal direction, in accordance with an aspect of the present invention.

FIG. 4 presents a flowchart generally representing one embodiment of the steps undertaken for selecting target candidates for input focus in a traversal direction as indicated at step 306 of FIG. 3. As part of selecting target candidates for input focus in a traversal direction, a region for identifying target candidates may be determined at step 402. In one embodiment, such a region may be determined to be the area of a user interface display from a parallel line lying on the edge of the user interface object with input focus to a bounding edge of the user interface display area in the direction of travel. Such a region may thus include any user interface objects overlapping the area between the parallel line in the direction of travel to a bounding edge of the user interface display area. In another embodiment, the region for identifying target candidates may be the union of the area of the user interface object with input focus and the area of the user interface display between a parallel line lying on the edge of the user interface object in the direction of travel and a bounding edge of the user interface display area in the direction of travel.

Figure 5:
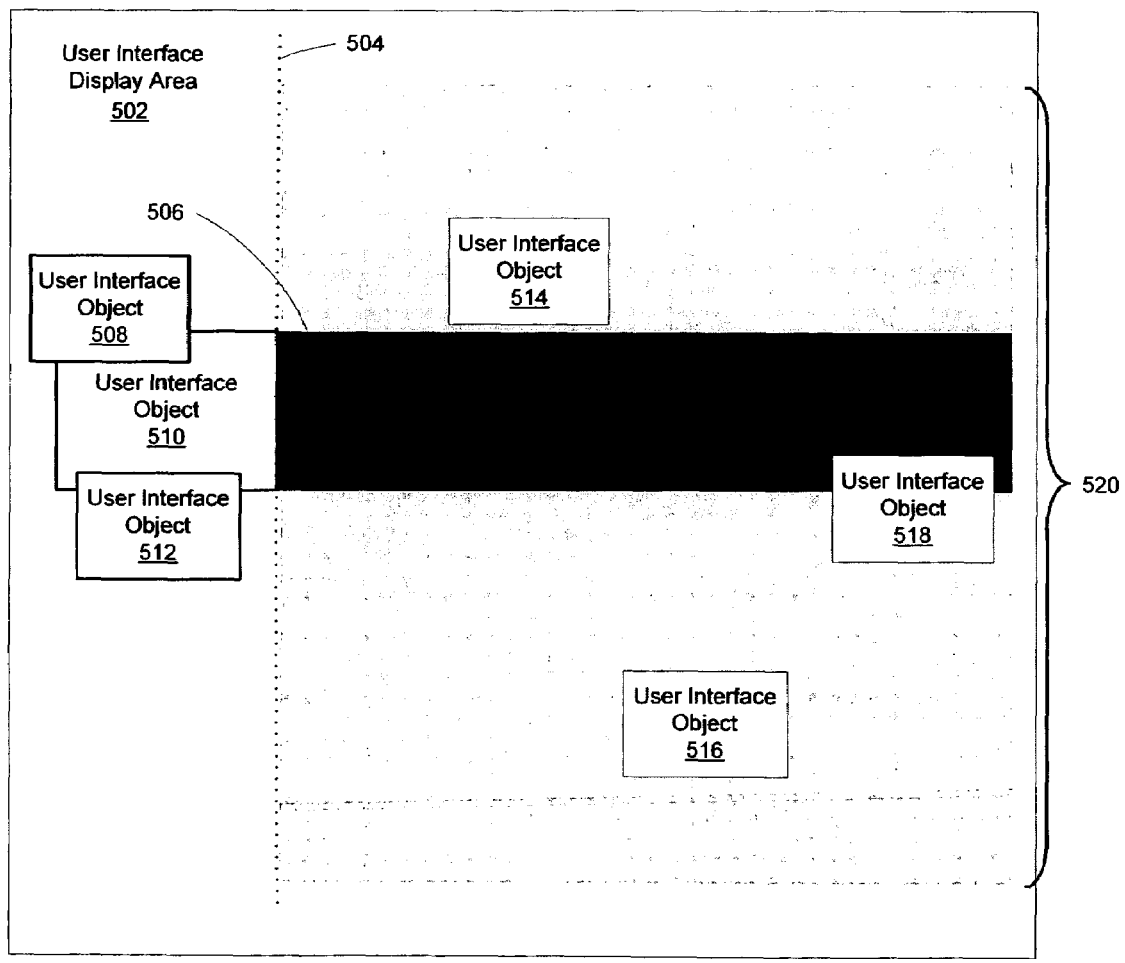
FIG. 5 is an illustration generally representing an exemplary region in a user interface display area for selecting target candidates in one embodiment, in accordance with an aspect of the present invention.

For example, FIG. 5 presents an illustration generally representing an exemplary region in a user interface display area for selecting target candidates in one embodiment. User interface display area 502 may include user interface objects 508, 510, 512, 514, 516 and 518. Considering that user interface object 510 may have input focus and that the direction of travel may be rightward, a vertical line 504 is shown to lie parallel on the edge of user interface object 510 in the direction of travel. A region 520 may be determined to be the area of a user interface display between line 504 and the bounding edge of the user interface display area in the direction of travel. Region 520 may thus include user interface objects 514, 516 and 518 which lie between the parallel line 504 in the direction of travel to the bounding edge of the user interface display area.

In one embodiment, the region for identifying target candidates may be region 520. In another embodiment, the region for identifying target candidates may be the region formed by the union of region 520 and the area of user interface object 510 that may have the input focus. Note that region 520 may include band 506 with the height of user interface object 510 that may emanate from the edge of user interface object 510 in the direction of travel to a bounding edge of the user interface display area. The union of the areas of the user interface object and the band emanating from it may also be referred to herein as a baseline region. In one embodiment, target candidates that overlap a baseline region, such as user interface objects 512 and 518, may be scored by determining a perpendicular distance from the edge of the user interface object with input focus opposite the direction of travel.

Returning to FIG. 4, user interface objects that may overlap the region determined for identifying target candidates may be identified at step 404. In the embodiment where the region determined for identifying target candidates may be the area of a user interface display from a parallel line lying on the edge of the user interface object with input focus to a bounding edge of the user interface display area in the direction of travel, such as region 520 in FIG. 5, user interface objects which wholly overlap this region may be identified as target candidates, such as user interface objects 514, 516 and 518. In the embodiment where the region determined for identifying target candidates may be formed by the union of the area of user interface object with the input focus and the area of a user interface display from a parallel line lying on the edge of the user interface object with input focus to a bounding edge of the user interface display area in the direction of travel, such as the union of region 520 and the area of user interface object 510 in FIG. 5, user interface objects whose edge opposite to the direction of travel at least partially overlaps the union of this region may be identified as target candidates. For example, user interface object 512 in FIG. 5 may be identified as a target candidate because its edge opposite the direction of travel partially overlaps the area of user interface object 510 that may have input focus. However, user interface object 508 may not be identified as a target candidate because its edge opposite the direction of travel does not at least partially overlap the area of user interface object 510 which may have input focus. In either embodiment, the user interface objects identified as target candidates may be selected as target candidates in step 406.

Figure 6:
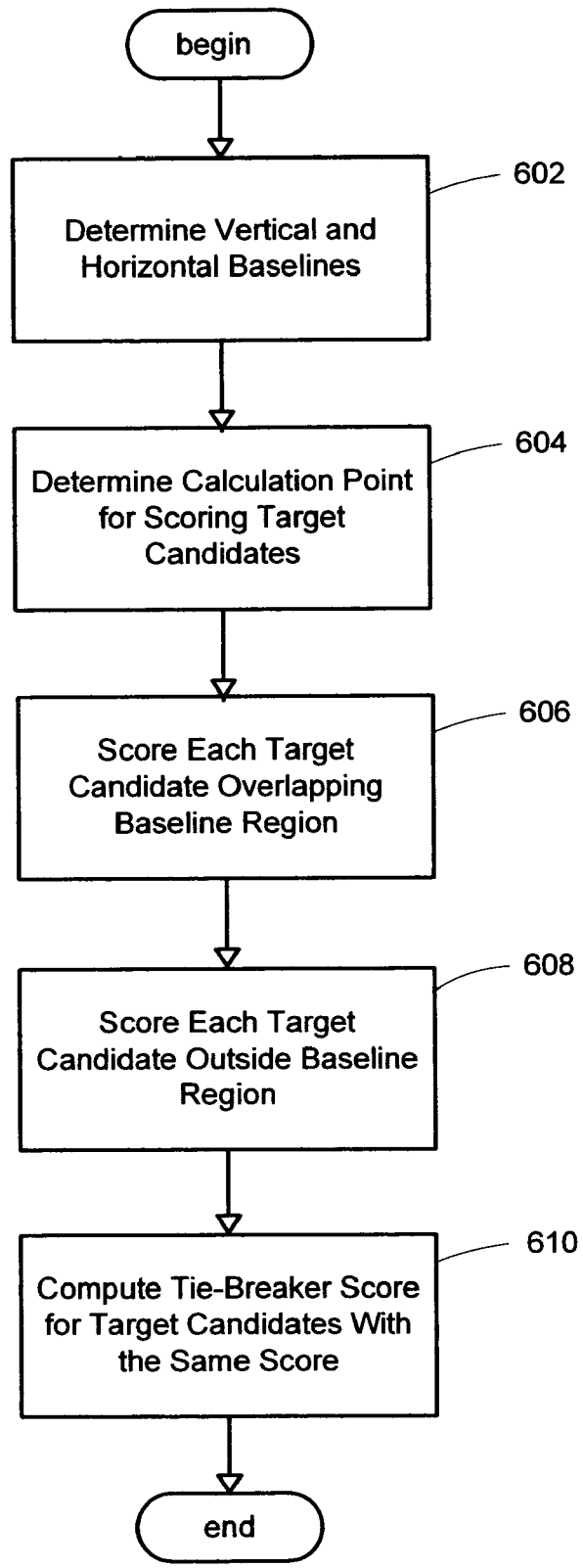
FIG. 6 is a flowchart generally representing an embodiment of the steps undertaken for scoring target candidates selected, in accordance with an aspect of the present invention.
Figure 7:
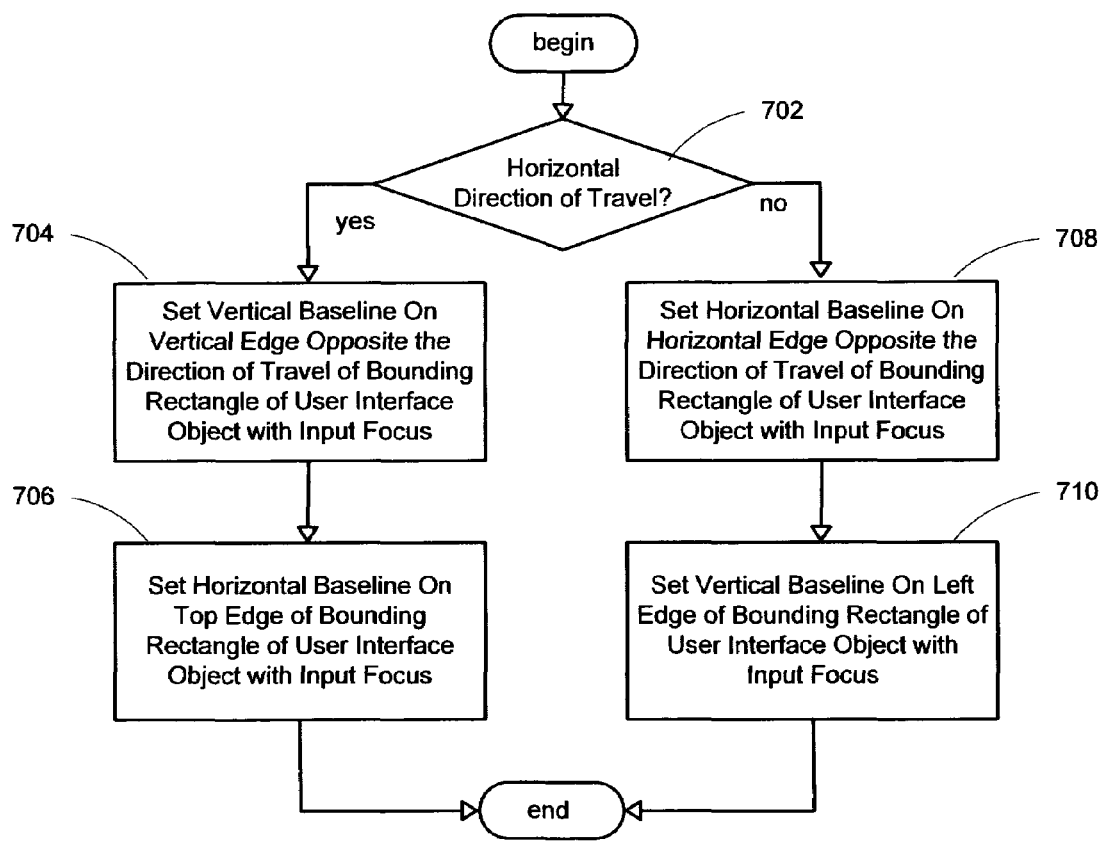
FIG. 7 is a flowchart generally representing an embodiment of the steps undertaken for determining vertical and horizontal baselines, in accordance with an aspect of the present invention.
Figure 10:
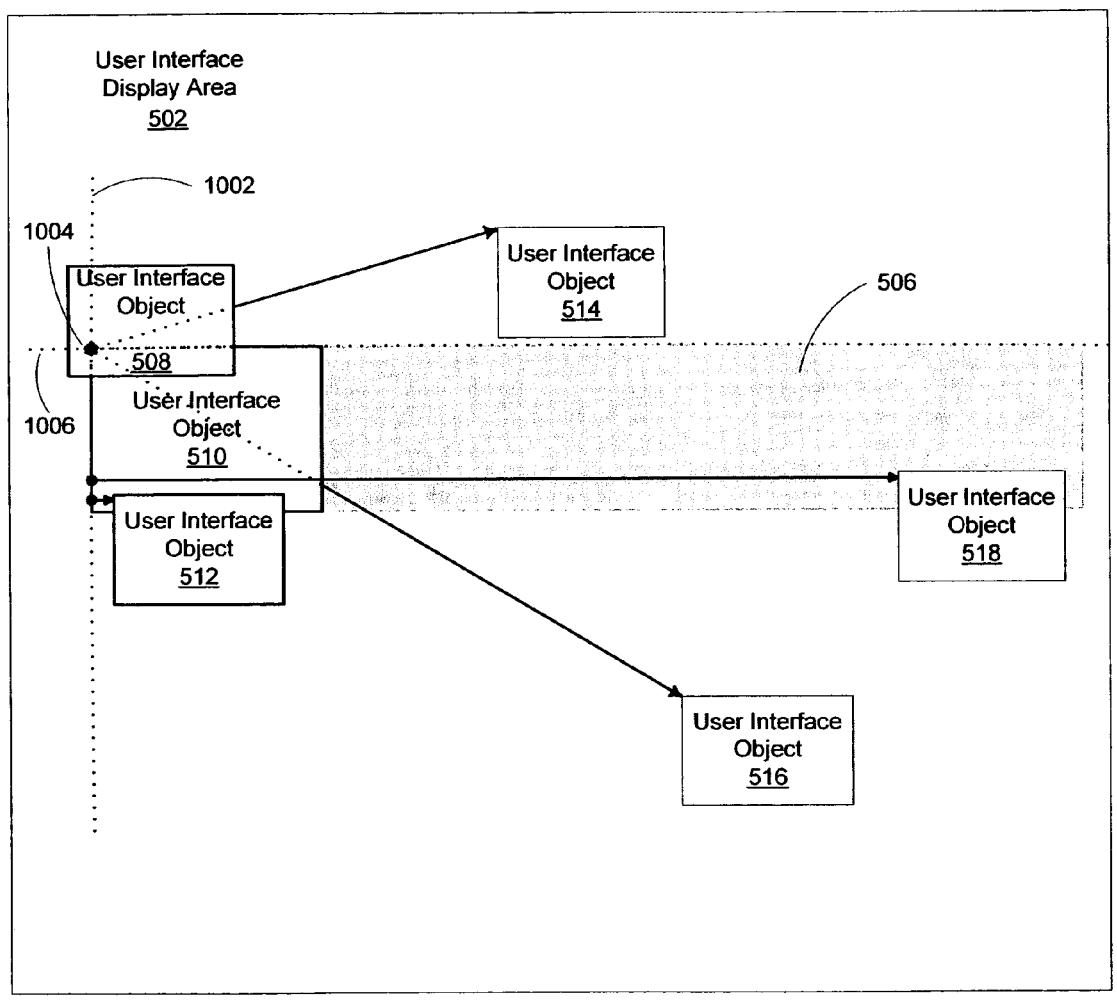
FIG. 10 is an illustration generally representing an example of an embodiment of scoring target candidates for a first traversal in a new direction of travel, in accordance with an aspect of the present invention.

FIG. 6 presents a flowchart generally representing an embodiment of the steps undertaken for scoring target candidates selected as indicated at step 308 of FIG. 3. Those skilled in the art will appreciate that an implementation may choose to perform these steps in a different order for purposes of efficiency or flexibility, while achieving the same effect and without departing from the scope of the present invention. At step 602 vertical and horizontal baselines may be determined for use in scoring target candidates. For example, FIG. 7 presents a flowchart generally representing an embodiment of the steps undertaken for determining vertical and horizontal baselines. In various embodiments, a bounding rectangle of a user interface object may be used for non-rectangular user interface objects in determining vertical and horizontal baselines. First the direction of travel may be determined. For example, at step 702, it may be determined whether the direction of travel is horizontal. If so, then a vertical baseline may be determined for a horizontal direction of travel to lie parallel on the vertical edge opposite the direction of travel of a bounding rectangle of the user interface object with input focus at step 704. And a horizontal baseline may be determined for a horizontal direction of travel to lie parallel to the top edge of a bounding rectangle of the user interface object with input focus at step 706. For example, a vertical baseline 1002 and a horizontal baseline 1006 may be shown in FIG. 10 given that user interface object 510 in FIG. 10 may have input focus and the direction of travel may be rightward. If the direction of travel is determined at step 702 to be vertical instead of horizontal, then a horizontal baseline may be determined for a vertical direction of travel to lie parallel on the horizontal edge opposite the direction of travel of a bounding rectangle of the user interface object with input focus at step 708. And a vertical baseline may be determined for a vertical direction of travel to lie parallel to the left edge of a bounding rectangle of the user interface object with input focus at step 710. In an embodiment, both baselines may be reset if the input focus may change through any other user interface mechanism, if the layout of the display representation of the user interface objects may change or if the direction of travel changes from horizontal to vertical or vertical to horizontal.

Figure 8:
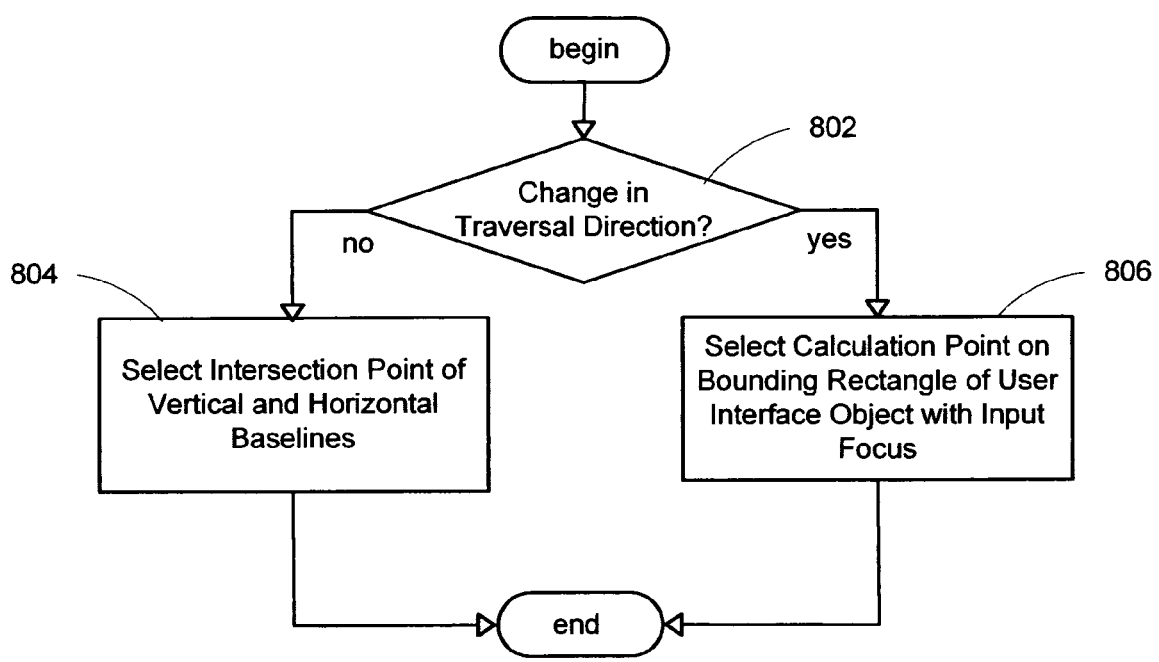
FIG. 8 is a flowchart generally representing an embodiment of the steps undertaken to determine a calculation point for scoring target candidates, in accordance with an aspect of the present invention.

Returning to FIG. 6, upon determining vertical and horizontal baselines, a calculation point may then be determined at step 604 that may be used for scoring target candidates. In one embodiment, scoring the target candidates may be biased when navigation continues in the same traversal direction for changing input focus. To do so, a calculation point may be selected as near as possible to the baseline of the first user interface object given input focus in that traversal direction. FIG. 8 presents a flowchart generally representing an embodiment of the steps undertaken to determine a calculation point for scoring target candidates. At step 802 it may be determined if there is a change in traversal direction. If there is no change in the direction of travel, then the intersection point of the vertical and horizontal baselines may be selected as the calculation point at step 804. If there is a change in the direction of travel, then a calculation point on a bounding rectangle of the user interface object with input focus may be selected at step 806.

Figure 9A:
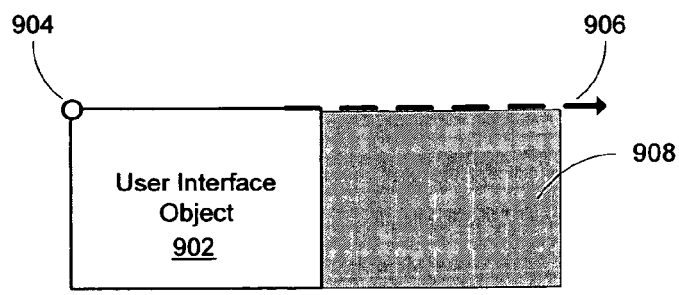
FIGS. 9A-9D are illustrations generally representing examples of selecting a calculation point on a bounding rectangle of a user interface object, in accordance with an aspect of the present invention.
Figure 9B:
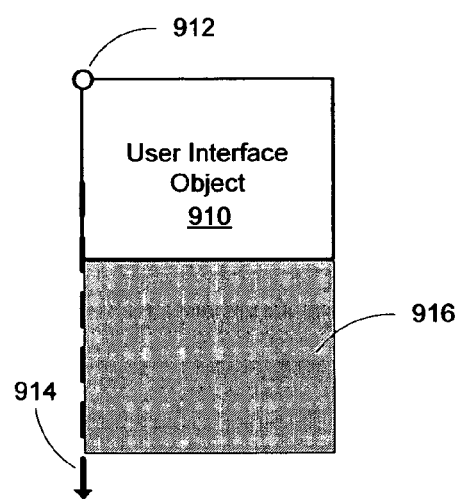

FIGS. 9A-9D present illustrations generally representing examples of selecting a calculation point on a bounding rectangle of a user interface object. In various embodiments, a bounding rectangle of a user interface object may be used for determining a calculation point of non-rectangular user interface objects. FIG. 9A shows an example of selecting a calculation point on a user interface object for a rightward traversal direction. The point of the top-left corner 904 of a bounding rectangle may be selected as a calculation point of user interface object 902 for a rightward direction of travel. Also shown is a horizontal baseline 906 lying parallel on the top edge of the bounding rectangle of user interface object 902 and a band 908 emanating from the edge of user interface object 902 in the direction of travel to a bounding edge of the user interface display area. FIG. 9B shows an example of selecting a calculation point on a user interface object for a downward traversal direction. The point of the top-left corner 912 of a bounding rectangle may be selected as a calculation point of user interface object 910 for a downward direction of travel. Also shown is a vertical baseline 914 lying parallel on the left edge of the bounding rectangle of user interface object 910 and a band 916 emanating from the edge of user interface object 910 in the direction of travel to a bounding edge of the user interface display area.

Figure 9C:
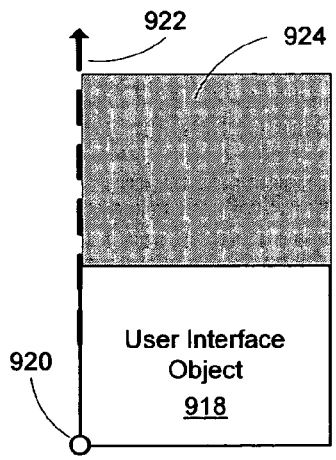
Figure 9D:
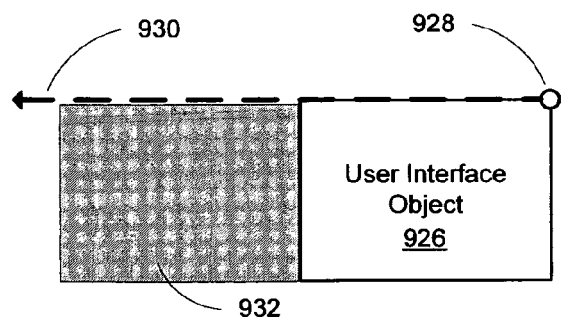

FIG. 9C shows an example of selecting a calculation point on a user interface object for an upward traversal direction. The point of the bottom-left corner 920 of a bounding rectangle may be selected as a calculation point of user interface object 918 for an upward direction of travel. Also shown is a vertical baseline 922 lying parallel on the left edge of the bounding rectangle of user interface object 918 and a band 924 emanating from the edge of user interface object 918 in the direction of travel to a bounding edge of the user interface display area. And FIG. 9D shows an example of selecting a calculation point on a user interface object for a leftward traversal direction. The point of the top-right corner 928 of a bounding rectangle may be selected as a calculation point of user interface object 926 for a leftward direction of travel. Also shown is a horizontal baseline 930 lying parallel on the top edge of the bounding rectangle of user interface object 926 and a band 932 emanating from the edge of user interface object 926 in the direction of travel to a bounding edge of the user interface display area.

Returning again to FIG. 6, once a calculation point may be determined for scoring target candidates, each target candidate at least partially overlapping a baseline region may then be scored at step 606. In one embodiment, the perpendicular distance from a baseline to the closest edge of each target candidate at least partially overlapping the baseline region may be determined for scoring each target candidate that overlaps the baseline region. For example, FIG. 10 presents an illustration generally representing an example of an embodiment of scoring target candidates for a first traversal in a new direction of travel.

User interface display area 502 may include user interface objects 508, 510, 512, 514, 516 and 518. Considering that user interface object 510 may have input focus and that the direction of travel may be rightward, a vertical baseline 1002 is shown to lie parallel on the edge of the bounding rectangle of user interface object 510 opposite the direction of travel, a horizontal baseline 1006 may be shown to lie on the top edge of the bounding rectangle of user interface object 510, and a calculation point 1004 may be shown to be the point of the top-left corner of the bounding rectangle of user interface object 510.

User interface object 518 may partially overlap the baseline region formed by band 506 and the area of user interface object 510. The perpendicular distance of the line illustrated in FIG. 10 from baseline 1002 to the closest edge of a bounding rectangle of user interface object 518 may be used as the score for user interface object 518. Similarly, user interface object 512 may overlap the baseline region and the perpendicular distance of the line illustrated in FIG. 10 from baseline 1002 to the closest edge of a bounding rectangle of user interface object 512 may be used as the score for user interface object 512. In this illustration, the score for user interface object 512 is lower since the perpendicular distance between the baseline 1002 and user interface object 512 is less than the perpendicular distance between baseline 1002 and user interface object 518.

Returning yet again to FIG. 6, once each target candidate overlapping the baseline region may be scored, then each target candidate outside the baseline region may be scored at step 608. In one embodiment, the radial distance from a point of a bounding rectangle of a user interface object with input focus to a point of a bounding rectangle of a target candidate may be determined for scoring each target candidate lying entirely outside of the baseline region. For example, user interface objects 514 and 516 illustrated in FIG. 10 may lie completely outside the baseline region formed by band 506 and the area of user interface object 510. The radial distance of the line illustrated in FIG. 10 from the calculation point 1004 of user interface object 510 with input focus to a target calculation point of the top-left corner of a bounding rectangle of user interface object 514 may be used as the score for user interface object 514. Similarly, the radial distance of the line illustrated in FIG. 10 from the calculation point 1004 of user interface object 510 with input focus to a target calculation point of the top-left corner of a bounding rectangle of user interface object 516 may be used as the score for user interface object 516. The score for user interface object 514 is lower since the radial distance between the calculation point 1004 and the target calculation point of user interface object 514 is less than the radial distance between the calculation point 1004 and the target calculation point of user interface object 516.

Returning to the last step of FIG. 6, a tie-breaker score may be determined for target candidates with the same score a step 610. For example, the radial distance may be determined between the calculation point of the user interface object with input focus and each target candidate overlapping the baseline region with the same score. The lowest radial score may be used as the tie-breaker score. In another embodiment, either one of two user interface elements with the same score may be chosen.

Figure 11:
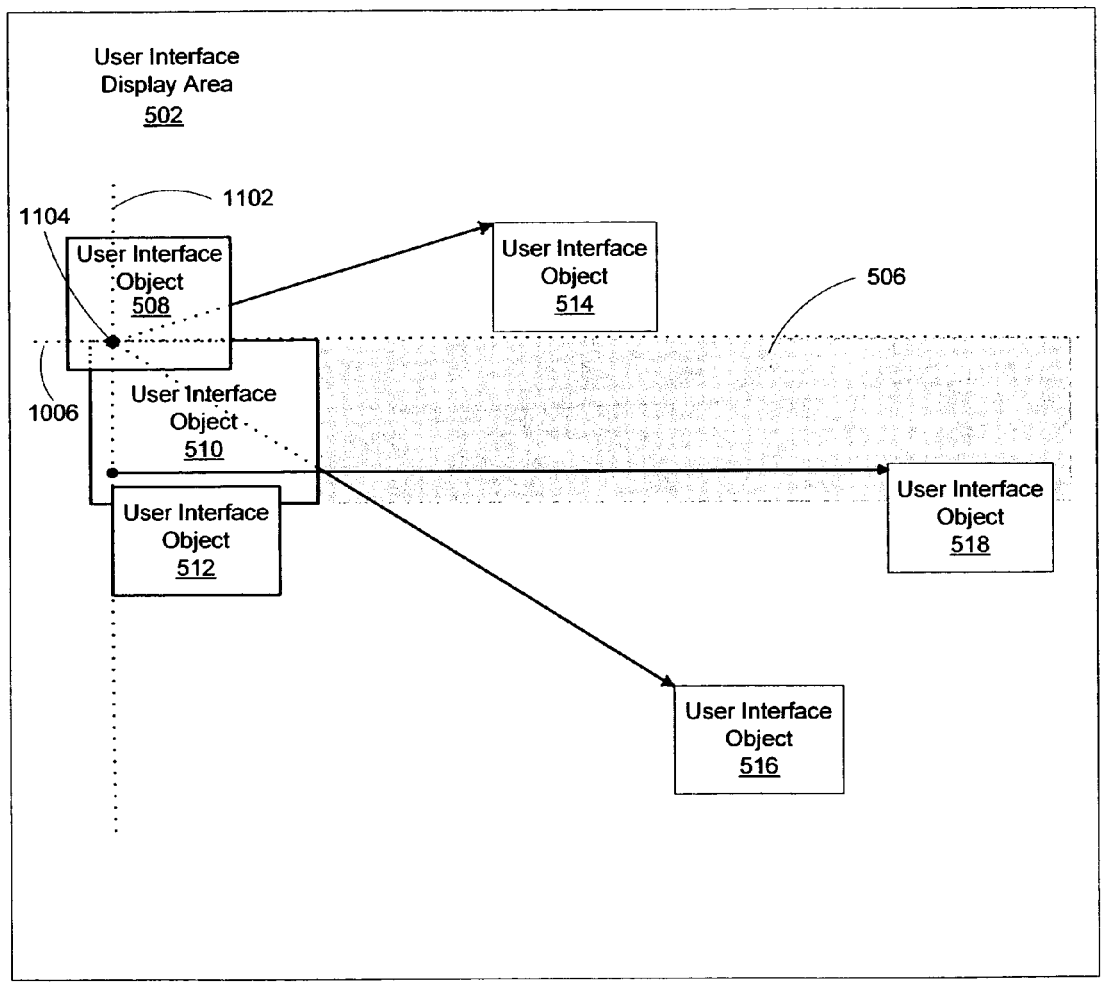
FIG. 11 is an illustration generally representing an example of an embodiment of scoring target candidates for a second traversal in the same direction of travel, in accordance with an aspect of the present invention.

After scoring target candidates, the input focus may be changed to a user interface object based upon the scoring. For example, the input focus may be changed to the user interface object with the lowest score such as user interface object 512 in FIG. 10. If subsequent traversals occur in the same direction of travel, the calculation point used for scoring target candidates may be the intersection point of the vertical and horizontal baselines in order to bias scoring in favor of target candidates near to the baseline of the direction of traversal. FIG. 11 is an illustration generally representing an example of an embodiment of scoring target candidates for a second traversal in the same direction of travel.

User interface display area 502 in FIG. 11 may include user interface objects 508, 510, 512, 514, 516 and 518. Considering that user interface object 512 may now have input focus after one traversal in a rightward direction and that the traversal direction continues rightward, a vertical baseline 1102 is shown to lie parallel on the edge of the bounding rectangle of user interface object 512 opposite the direction of travel, a horizontal baseline 1006 may be shown to lie on the top edge of the bounding rectangle of user interface object 510 which was the first user interface object to initially receive input focus in this traversal direction, and a calculation point 1104 may be shown to be the intersection point of the vertical and horizontal baselines. After scoring selected target candidates according to the steps of FIG. 6, the input focus may be changed to the user interface object with the lowest score such as user interface object 514 in FIG. 11.

Thus, scoring the target candidates may be biased when navigation continues in the same traversal direction for changing input focus. To do so, a calculation point may be selected as near as possible to the baseline of the first user interface object given input focus in that traversal direction. Those skilled in the art will appreciate that this system and method may provide more predictable directional focus navigation for changing input focus of user interface objects in the same traversal direction. Furthermore, the architecture of the present invention may flexibly accommodate different target candidate selectors for implementing other target selection methods as well as different target candidate scorers for implementing other target scoring methods.

As can be seen from the foregoing detailed description, there is provided a system and method for directional focus navigation in a user interface. The system and method may accept any discrete directional input from a directional input device, including arrow keys of a keyboard, a directional key of a phone, a directional pad such as forward or backward of a remote control, and change the input focus of user interface objects according to the directional input. Moreover, the present invention may offer directional focus navigation for user interface applications that may include hundreds of user interface objects such as web page browsers. The system and method thus provide significant advantages and benefits needed in contemporary software applications and user interfaces on any number of devices. For instance, while directional focus navigation may determine in real-time which user interface object may receive input focus, in some devices the behavior of directional navigation may be predetermined and programmed for fixed user interface objects.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for focus navigation of a user interface, comprising:
   a computing processor;
   a discrete, directional input device, the discrete, directional input device comprising an input device other than a mouse; and
   one or more computer-readable media storing computer executable components comprising:
      a directional focus navigation engine for changing an input focus from a current user interface object in the user interface, the input focus being changed in response to receiving a single, discrete, directional input from the discrete, directional input device;
      a target candidate selector operably coupled to the directional focus navigation engine for selecting target candidates that are in a traversal direction indicated by the single, discrete, directional input, the target candidates being selected from among one or more user interface objects for receiving the input focus, and the target candidate selector operating to:
         define a selection region including at least an edge of the current user interface object in the direction of the single, discrete directional input through a parallel edge of a display area;

define a baseline region within the selection region and which is a subset of the selection region; and select target candidates that overlap the selection region in the direction of the single, discrete, directional input and only when an edge opposite to the direction of the single, discrete, directional input overlaps the selection region; and a target candidate scorer operably coupled to the directional focus navigation engine for scoring the target candidates selected for receiving the input focus, whereby the scoring of each target candidate is used to select a user interface object to receive input focus in response to the single, discrete, directional input, and wherein scoring the target candidates includes:

for all selected target candidates that at least partially overlap the baseline region, scoring them according to their perpendicular distance from an edge of the current user interface object, in a direction parallel to the direction of the single, discrete, directional input; and for all selected target candidates that do not overlap the baseline region, scoring them according to their radial distance from a point on a line partially defining one edge of the baseline region.

2. The system of claim 1 further comprising an application operably coupled to the directional focus navigation engine, the application having one or more user interface objects receiving a single, discrete directional input from the discrete, directional input device.

3. The system of claim 2 further comprising an output interface operably coupled to the directional focus navigation engine for outputting an indication of the user interface object with the input focus to an output device.

4. The system of claim 3 further comprising an output device operably coupled to the output interface for receiving an indication of the user interface object with the input focus.

5. The system of claim 4 wherein the output device comprises a user interface display and wherein receiving the indication comprises receiving a display representation of the user interface object with input focus for displaying on the user interface display.

6. The system of claim 1 further comprising an input system operably coupled to the directional focus navigation engine for communicating input from the discrete directional input device to the focus navigation engine.

7. The system of claim 6 wherein the discrete, directional input device is operably coupled to the input interface for sending discrete directional input from a user to the input system.

8. The system of claim 7 wherein the discrete directional input device comprises arrow keys for sending a discrete, directional input.

9. A method for focus navigation of a user interface in a computer system, comprising:

receiving a single, discrete, directional input for changing the input focus from a current user interface object in the user interface, the single, discrete, directional input being received from an input device other than a mouse, wherein the single, discrete, directional input indicates a traversal direction selected by the user to indicate the direction of a user interface object desired by the user;

selecting target candidates in the direction of travel indicated by the single discrete, directional input from among one or more user interface objects for receiving the input focus, and by:

defining a selection region that includes at least an edge of the current user interface object in the direction of the single, discrete, directional input through a parallel edge of a display area;

defining a baseline region within the selected region and which is a subset of the selection region; and selecting target candidates that overlap the selection region in the direction for the single, discrete, directional input and only when an edge opposite to the direction of the single, discrete, directional input overlaps the selection region;

scoring the target candidates selected for receiving the input focus, wherein scoring the target candidates comprises:

for all selected target candidates that at least partially overlap the baseline region, scoring them according to their perpendicular distance from an edge of the current user interface object, in a direction parallel to the direction of the single, discrete, directional input; and for all selected target candidates that do not overlap the baseline region, scoring them according to their radial distance from a point on a line partially defining one edge of the baseline region; and changing the input focus to a user interface object based upon the scoring.

10. The method of claim 9 further comprising locating the user interface object that has the input focus.

11. The method of claim 9 further comprising outputting an indication of the user interface object with the input focus.

12. The method of claim 11 wherein outputting an indication of the user interface object with the input focus comprises generating a display representation of the user interface object with the input focus for displaying on a user interface display.

13. The method of claim 12 further comprising displaying the display representation of the user interface object with the input focus on a user interface display.

14. The method of claim 9 wherein selecting target candidates in the direction of travel indicated by the single, discrete, directional input comprises determining a region for identifying target candidates.

15. The method of claim 14 wherein determining the region for identifying target candidates comprises identifying the region formed by the union of the area of the user interface object with input focus and the area of the user interface display between a parallel line lying on the edge of the user interface object in the direction of travel indicated by the single, discrete, directional input and a bounding edge of the user interface display area in the direction of travel indicated by the single, discrete, directional input.

16. The method of claim 9 wherein selecting target candidates in the direction of travel indicated by the single, discrete, directional input comprises identifying user interface objects that overlap a region as target candidates.

17. The method of claim 9 wherein selecting target candidates in the direction of travel indicated by the single, discrete, directional input comprises selecting user interface object that overlap a region as target candidates.

18. The method of claim 9 wherein scoring the target candidates selected for receiving the input focus comprises determining vertical and horizontal baselines.

19. The method of claim 18 wherein determining vertical and horizontal baselines comprises determining whether the direction of travel indicated by the single, discrete, directional input may be horizontal, and if so, setting the vertical baseline on a vertical edge of a bounding rectangle of a user interface object with input focus, the vertical edge of the bounding rectangle lying opposite the direction of travel indicated by the single, discrete, directional input.

20. The method of claim 18 wherein determining vertical and horizontal baselines comprises determining whether the direction of travel indicated by the single, discrete, directional input may be horizontal, and if so, setting the horizontal baseline on the top edge of a bounding rectangle of a user interface object with input focus.

21. The method of claim 18 wherein determining vertical and horizontal baselines comprises determining whether the direction of travel indicated by the single, discrete, directional input may be vertical, and if so, setting the horizontal baseline on a horizontal edge of a bounding rectangle of a user interface object with input focus, the horizontal edge of the bounding rectangle lying opposite the direction of travel indicated by the single, discrete, directional input.

22. The method of claim 18 wherein determining vertical and horizontal baselines comprises determining whether the direction of travel indicated by the single, discrete, directional input may be vertical, and if so, setting the vertical baseline on the left edge of a bounding rectangle of a user interface object with input focus.

23. The method of claim 9 wherein scoring the target candidates selected for receiving the input focus comprises determining a calculation point.

24. The method of claim 23 wherein determining the calculation point comprises determining whether the direction of travel indicated by the single, discrete, directional input changed, and if so, selecting a calculation point on a bounding rectangle of a user interface object with input focus.

25. The method of claim 24 wherein selecting a calculation point on a bounding rectangle of a user interface object with input focus comprises selecting the point of the top-right corner of the bounding rectangle for a leftward direction of travel indicated by the single, discrete, directional input.

26. The method of claim 24 wherein selecting a calculation point on a bounding rectangle of a user interface object with input focus comprises selecting the point of the top-left corner of the bounding rectangle for a rightward direction of travel indicated by the single, discrete, directional input.

27. The method of claim 24 wherein selecting a calculation point on a bounding rectangle of a user interface object with input focus comprises selecting the point of the top-left corner of the bounding rectangle for a downward direction of travel indicated by the single, discrete, directional input.

28. The method of claim 24 wherein selecting a calculation point on a bounding rectangle of a user interface object with input focus comprises selecting the point of the bottom-left corner of the bounding rectangle for an upward direction of travel indicated by the single, discrete, directional input.

29. The method of claim 23 wherein determining the calculation point comprises determining whether the direction of travel indicated by the single, discrete, directional input changed, and if not, selecting the intersection point of a vertical baseline and a horizontal baseline.

30. The method of claim 9 wherein scoring the target candidates selected for receiving the input focus comprises scoring each target candidate that at least partially overlaps a baseline region.

31. The method of claim 30 wherein scoring each target candidate at least partially overlapping the baseline region comprises determining the perpendicular distance from a baseline to the closest edge of each target candidate at least partially overlapping the baseline region, the baseline lying on an edge, opposite the direction of travel indicated by the single, discrete, directional input, of a bounding rectangle of a user interface object with input focus.

32. The method of claim 9 wherein scoring the target candidates selected for receiving the input focus comprises scoring each target candidate lying entirely outside of the baseline region.

33. The method of claim 32 wherein scoring each target candidate lying entirely outside of the baseline region comprises determining the radial distance from a point of a bounding rectangle of a user interface object with input focus to a point of a bounding rectangle of a target candidate lying entirely outside of the baseline region.

34. The method of claim 9 wherein scoring the target candidates selected for receiving the input focus comprises computing a tie-breaking score for target candidates at least partially overlapping the baseline region and having the same score.

35. A computer-readable storage media storing computer-executable instructions that when executed perform the method of claim 9.

36. The method of claim 9 further comprising:
receiving an additional single, discrete, directional input subsequent to the single, discreet, directional, input, the additional single, discrete, directional input for further changing the input focus of a user interface, the additional single, discrete, directional input being received from the input device other than a mouse and in the same direction as the single, discrete, directional input;
selecting target candidates in the direction of travel indicated by the additional single, discrete, directional input from among one or more user interface objects for receiving the input focus;
scoring the target candidates selected for receiving the input focus, wherein the target candidates are biased in the direction of the additional single, discrete, directional input; and
changing the input focus to a user interface object based upon the scoring.

* * * * *